(12) United States Patent
Buhrmann

(10) Patent No.: US 6,256,518 B1
(45) Date of Patent: Jul. 3, 2001

(54) SYSTEM FOR PROVIDING POWER TO A WIRELESS SYSTEM

(75) Inventor: Michael Buhrmann, Redmond, WA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/948,777

(22) Filed: Oct. 10, 1997

(51) Int. Cl.[7] .................................................... H04Q 7/20
(52) U.S. Cl. ......................... 455/572; 455/422; 455/74; 455/74.1; 455/425
(58) Field of Search .................................. 455/422, 462, 455/463, 464, 572, 573, 574, 401, 402, 554, 5.1, 74, 74.1

(56) References Cited

U.S. PATENT DOCUMENTS

| | | |
|---|---|---|
| 4,232,200 | 11/1980 | Hestad et al. . |
| 4,847,899 * | 7/1989 | Hikida ................................. 379/413 |
| 5,111,499 * | 5/1992 | Umemoto et al. .................. 455/462 |
| 5,157,711 | 10/1992 | Shimanuki . |
| 5,343,514 | 8/1994 | Snyder . |
| 5,353,331 | 10/1994 | Emery et al. ........................... 379/58 |
| 5,400,388 * | 3/1995 | Heo ....................................... 455/572 |
| 5,553,138 | 9/1996 | Heald et al. . |
| 5,661,796 * | 8/1997 | Haraguchi ............................. 379/413 |
| 5,687,228 * | 11/1997 | Ellington, Jr. et al. .............. 379/395 |
| 5,734,711 * | 3/1998 | Kleffner .............................. 379/323 |
| 5,857,010 * | 1/1999 | Chiba ............................. 455/572 X |
| 5,946,617 * | 8/1999 | Portaro et al. ....................... 455/422 |
| 5,970,138 * | 10/1999 | Suda et al. ........................... 379/412 |
| 6,073,031 * | 6/2000 | Helstab et al. ....................... 455/557 |
| 6,088,599 * | 7/2000 | Fujiwara .............................. 455/573 |

FOREIGN PATENT DOCUMENTS

0020156 * 1/1990 (JP) .

* cited by examiner

Primary Examiner—Daniel Hunter
Assistant Examiner—Yemane Woldetatios
(74) Attorney, Agent, or Firm—Kenyon & Kenyon

(57) ABSTRACT

A location is provided with a fixed wireless transceiver. The wireless transceiver is coupled to a land-line that connects the location to the local exchange carrier's central office. The wireless device is powered by power received from a central office over the land-line connection.

9 Claims, 1 Drawing Sheet

SYSTEM FOR PROVIDING POWER TO A WIRELESS SYSTEM

BACKGROUND OF THE INVENTION

The present invention is directed to a system for providing power to a receiver in a wireless communication system. More particularly, the present invention is directed to providing power from a local exchange carrier to a fixed wireless transceiver that is part of a wireless communication system.

The marketplace has seen a proliferation of subscribers to wireless communications services. Subscribers turn to such services for a myriad of reasons. Among those reasons are the services being offered in connection with what are referred to as PCS communications which combine voice and data messaging capabilities. Furthermore, the subscriber to a wireless service typically has a choice of service providers in the area of interest. In contrast to land-line telephone communication networks where typically one local service provider is assigned to a given region, there may be three or four service providers within a given region of interest depending on how many service providers have been allocated in accordance with frequency band allocations. Thus, it is becoming more and more desirable to have those advantages of wireless communication available at the home on a fixed basis in addition to providing wireless communication capabilities of a mobile nature.

A problem arises in connection with providing power to the fixed wireless transceiver. In one configuration the power would be derived from local power sources such as an electric utilities company, via connection of a converter to a standard 60 Hz 110 volt outlet. This powering capability, however, is vulnerable to power outages. As a consequence, should the utility suffer some power failure of any prolonged duration, the wireless transceiver, even if it can operate in the short term on battery power, will eventually become inoperative due to an absence of a power supply.

It is known in the prior art as shown in U.S. Pat. Nos. 5,553,138 to Heald et al., 5,343,514 to Snyder, 5,157,711 to Shimanuki, and 4,232,200 to Hestad et al. to derive power for a communication instrument from a land-line connection to a central office. However, in all of those configurations communication is accomplished by the communication device over the same land-line that provides power to the device.

There remains a need for finding a more reliable source of power to a fixed wireless transceiver to avoid a disruption of service in the event of power outages.

SUMMARY OF THE INVENTION

The present invention is directed to providing power to a wireless transceiver so that it will continue to operate despite power disruptions from an electrical utility. This is accomplished in accordance with an embodiment of the present invention in which the wireless transceiver is powered by a land-line connection to a local exchange or central office. In one embodiment of the invention the handset is part of the wireless transceiver and that transceiver includes a power converter that receives power from the land-line connection and matches it to the power specifications for the cellular transceiver. In an alternative configuration, the wireless transceiver can be part of a base station with which a handset can cordlessly communicate. The power conversion circuits are disposed in the base station with the wireless transceiver. This would allow a user to have the benefit of a cordless telephone with a fixed wireless transceiver powered by the local exchange.

Thus, the wireless transceiver receives its power from the local exchange carrier over a land-line connection which it does not use for any other purpose than to receive power. As a consequence, the transceiver remains powered even in the event of a power outage that might otherwise effect electrical appliances in a location which is subject to the outage.

DETAILED DESCRIPTION

Figure 1A:
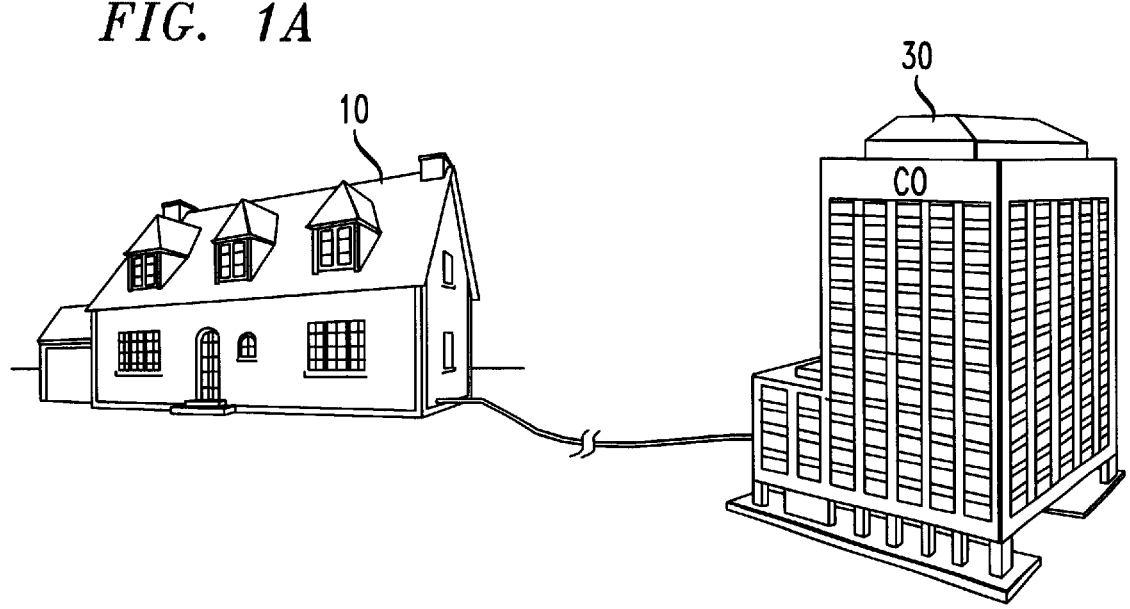
FIG. 1A illustrates a phone land-line communication connection.

As described above in connection with the cited U.S. patents, it is known in the prior art that a land-line telephone connection provides power from a central office to a location. For instance, as shown in FIG. 1A a home residence 10 is connected via land-line 20 to central office 30. The land-line connection carries power from the central office to the residence. The original intent of providing the power from the central office was to provide power for the telephone in its operation to provide service to the end user (dialing capabilities, power for the internal circuitry of the phone, etc.). The power that has been supplied by the central office, as indicated in the earlier cited patents, has also come to be used to provide power to other communication elements which interface with the land-line to provide communications over the land-line. For instance, in U.S. Pat. No. 5,553,138, the system provides power to a base station unit that carries communications to the land-line phone from a computer.

The other patents show examples of other communication equipment powered by the land-line over which the communication occurs.

Figure 1B:
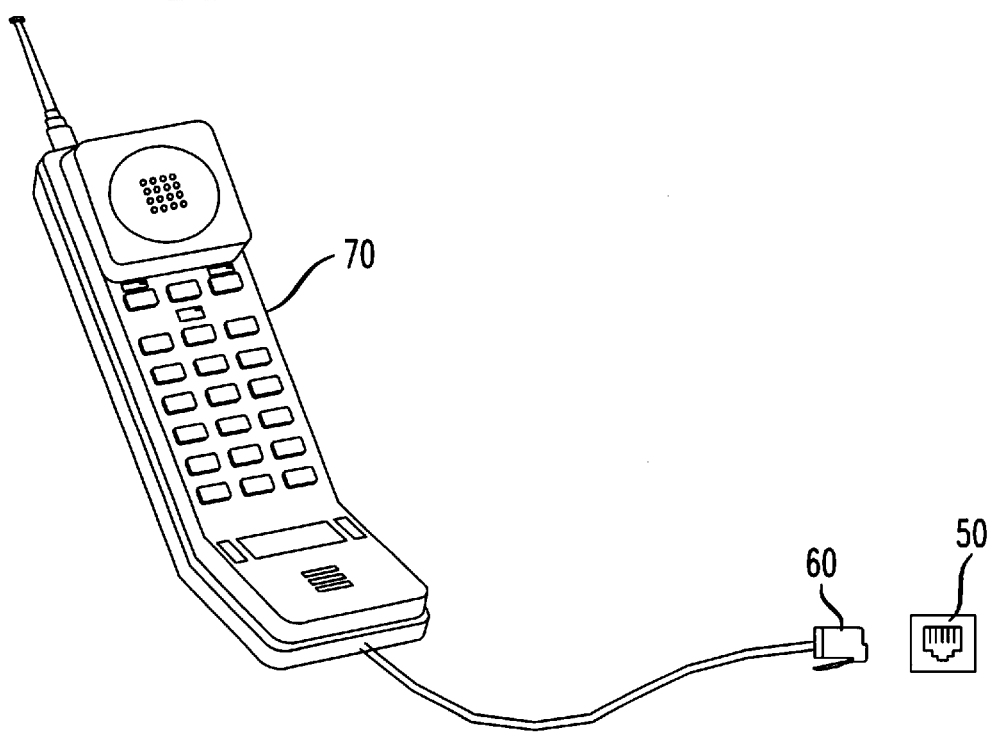
FIG. 1B illustrates an embodiment of the present invention.

In the present invention, a fixed wireless transceiver provides wireless communication and yet is powered by a connection to a land-line coupled to the central office. As illustrated in FIG. 1B, a wireless transceiver 70, can take the form of a standard telephone except that it includes an antenna for wireless communication to a base station similar to that in the cellular environment or wireless communication to a central office. The transceiver can be coupled via a plug 60 to a wall outlet or receptacle unit 50 which is coupled to the land-line 20 that connects the residence 10 to the central office 30 (see FIG. 1A). In this configuration, the plug 60, in its connection to the receptacle unit 50, receives power from the land-line 20. That power is provided to circuitry internal to the wireless transceiver 70. The circuitry, not shown, converts the received power to the appropriate power specification prescribed for operating the wireless transceiver. Such circuits would be easily built by one of ordinary skill in the art and could be considered analogous to circuitry already existing in cellular phones which derive power, for example, from automobile power sources or from typical utility power sources, e.g., AC 110 volt sources. The details of the circuitry do not form the basis for the present invention.

In an alternative form, the present invention can be employed using an additional piece of equipment, namely a base station. The base station would have the wireless transceiver included therein and would be connected to the plug 60 that is coupled to the receptacle 50. A separate handset would be provided for cordless communication with the base station. The converter circuitry would then be disposed within the base station and the cordless handset would communicate with the "fixed" wireless transceiver in the base station that is powered by the local exchange.

By implementing the present invention, a subscriber can have all of the benefits of wireless communication in a fixed location while reducing the vulernability to power outages which might otherwise cripple electrical appliances within the location.

The present invention would also be easy to install in most locations since locations typically have more than one phone receptacle for a given land-line to a central office. Thus, a phone line which is being used to provide land-line service for the residence or location 10 can still provide the appropriate power for the wireless communication device so long as the communication device is coupled to an outlet which is not presently serving a telephone set or other communication device interfacing with the land-line.

The present invention then provides a dependable power supply for a wireless communication device that enhances the subscriber's communication capabilities with an uncomplicated installation.

What is claimed is:

1. A communication system that interacts with a fixed cellular communication unit, the system comprising:
   a cellular antenna that exchanges calls from and to the fixed cellular communication unit and a cellular communications network; and
   means for providing remote power from a local exchange carrier to said fixed cellular communication unit.

2. The system of claim 1 wherein said fixed cellular communication unit comprises a cellular telephone.

3. The system of claim 1 wherein said means for providing remote power comprises a telephone line from a local exchange carrier.

4. The system of claim 3 wherein said fixed cellular communication unit comprises a cellular telephone.

5. A wireless communications system comprising:
   a cellular communications network including an antenna for exchanging incoming and outgoing cellular calls;
   means for establishing a wireless communication connection between a fixed cellular telephone and said cellular communications network; and
   means for providing remote power from a local exchange carrier to said fixed cellular telephone.

6. The system of claim 5, wherein said means for providing remote power includes a telephone line from a local exchange carrier.

7. A wireless communications system comprising:
   a wireless communications network including an antenna for exchanging incoming and outgoing wireless calls;
   means for establishing a wireless communication connection between a fixed wireless base station and said wireless communications network; and
   means for providing remote power from a local exchange carrier to said fixed wireless base station.

8. The wireless communications system of claim 7, wherein said wireless communications network comprises a cellular communications network.

9. The wireless communications system of claim 7, wherein said wireless communications network comprises a PCS wireless communications network.

* * * * *

UNITED STATES PATENT AND TRADEMARK OFFICE
CERTIFICATE OF CORRECTION

PATENT NO.    : 6,256,518 B1
DATED         : July 3, 2001
INVENTOR(S)   : M. Buhrmann It is certified that error appears in the above-identified patent and that said Letters Patent is hereby corrected as shown below:

<u>Title page,</u>
Item [73], Assignee, change from "AT&T Corp." to -- AT&T Wireless --.

Signed and Sealed this

Twenty-sixth Day of November, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.      : 6,256,518 B1
DATED           : July 3, 2001
INVENTOR(S)     : Michael Buhrmann It is certified that error appears in the above-identified patent and that said Letters Patent is hereby corrected as shown below:

<u>Title page,</u>
Item [73], Assignee, change from "AT&T Wireless" to -- AT&T Wireless Services, Inc. --

Signed and Sealed this

Fourteenth Day of October, 2003

JAMES E. ROGAN
*Director of the United States Patent and Trademark Office*